United States Patent
Shono et al.

(10) Patent No.: US 12,327,044 B2
(45) Date of Patent: Jun. 10, 2025

(54) MEMORY SYSTEM

(71) Applicant: Kioxia Corporation, Tokyo (JP)

(72) Inventors: Atsuo Shono, Kamakura (JP);
Kiyotaka Iwasaki, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/337,137

(22) Filed: Jun. 19, 2023

(65) Prior Publication Data

US 2024/0094947 A1  Mar. 21, 2024

(30) Foreign Application Priority Data

Sep. 20, 2022  (JP) ................ 2022-149365

(51) Int. Cl.
*G06F 3/06* (2006.01)
(52) U.S. Cl.
CPC ......... *G06F 3/0658* (2013.01); *G06F 3/0679* (2013.01); *G06F 3/0604* (2013.01)
(58) Field of Classification Search
None
See application file for complete search history.

(56) References Cited

U.S. PATENT DOCUMENTS

| | | |
|---|---|---|
| 2015/0212732 A1 | 7/2015 | Parker et al. |
| 2019/0214087 A1 | 7/2019 | Weinberg et al. |
| 2020/0081656 A1* | 3/2020 | Park ............... G06F 3/0673 |
| 2021/0389878 A1* | 12/2021 | Lindberg .......... G06F 3/0659 |
| 2022/0011970 A1* | 1/2022 | Nubile ............. G06F 3/0659 |
| 2022/0012196 A1* | 1/2022 | Lee ................. G11C 7/1063 |
| 2022/0084568 A1 | 3/2022 | Endo |
| 2023/0045463 A1* | 2/2023 | Kim ................ G06F 3/0688 |
| 2023/0046535 A1* | 2/2023 | Cariello ........... G06F 3/061 |

FOREIGN PATENT DOCUMENTS

CN  110888825 A  3/2020

* cited by examiner

*Primary Examiner* — Stephanie Wu
(74) *Attorney, Agent, or Firm* — Oblon, McClelland, Maier & Neustadt, L.L.P.

(57) ABSTRACT

According to one embodiment, a system includes: a memory, and a controller, wherein the memory includes a first die including first and second planes and a second die including a third plane, and the controller issues a read command to the first and second dies, if a read time for first data in the first plane has ended, a read time for second data in the second plane has ended after the end of the read time for the first data, and a read time for third data in the third plane has ended after the end of the read time for the second data, receives the first data from the first die, receives the third data from the second die after completion of receiving the first data, and receives the second data from the first die after completion of receiving the third data.

10 Claims, 8 Drawing Sheets

MEMORY SYSTEM

CROSS-REFERENCE TO RELATED APPLICATIONS

This application is based upon and claims the benefit of priority from prior Japanese Patent Application No. 2022-149365, filed Sep. 20, 2022, the entire contents of which are incorporated herein by reference.

FIELD

Embodiments described herein relate generally to a memory system.

BACKGROUND

A NAND flash memory that can nonvolatilely store data is known.

DETAILED DESCRIPTION

With reference to FIGS. 1 to 8, a memory system according to each embodiment will be described.

Embodiments will now be described in detail with reference to the accompanying drawings. In the following description, the same reference numerals denote elements having the same functions and arrangements. In the following embodiment, when constituent elements (for example, circuits, interconnections, and various voltages and signals) having reference numerals with numerals/alphabetical letters at the end for distinction need not be distinguished from each other, descriptions (reference numerals) from which numerals/alphabetical letters at the end are omitted are used.

In general, according to one embodiment, a memory system includes: a nonvolatile memory, and a memory controller capable of data reading from the nonvolatile memory, wherein the nonvolatile memory includes a first memory die and a second memory die, the first memory die includes a first plane and a second plane, the second memory die includes a third plane, and the memory controller is capable of issuing a read command to the first memory die and the second memory die, in a case where a read time for first data stored in the first plane has ended, a read time for second data stored in the second plane has ended after the end of the read time for the first data, and a read time for third data stored in the third plane has ended after the end of the read time for the second data, receiving the first data from the first memory die, receiving the third data from the second memory die after completion of receiving the first data, and receiving the second data from the first memory die after completion of receiving the third data.

EMBODIMENT

(1) First Embodiment (a) Arrangement (a-1) Arrangement of Information Processing System 1

Figure 1:
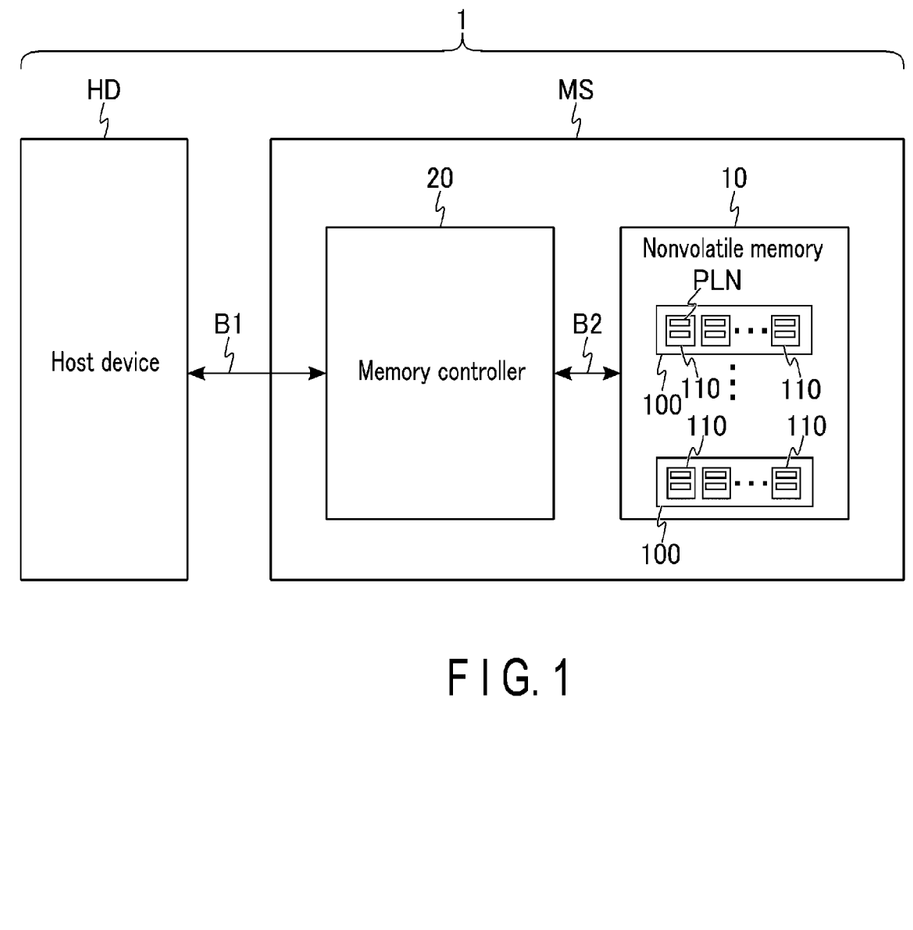
FIG. 1 is a view showing the arrangement of an information processing system according to an embodiment.

FIG. 1 is a block diagram showing an example of the arrangement of an information processing system 1 according to this embodiment.

The information processing system 1 includes a host device HD and a memory system MS.

The host device HD is an electronic apparatus such as a personal computer, a mobile information terminal, or a server.

The memory system MS is a semiconductor storage device such as a memory card or an SSD (solid state drive). The memory system MS includes a nonvolatile memory 10 and a memory controller 20.

The nonvolatile memory 10 is a memory device that nonvolatilely stores data. In this embodiment, the nonvolatile memory 10 is, for example, a NAND flash memory. However, the nonvolatile memory 10 may be a NOR flash memory, an MRAM (Magneto-resistive Random Access Memory), a PRAM (Phase Change Random Access Memory), an ReRAM (Resistive Random Access Memory), or an FeRAM (Ferroelectric Random Access Memory). The nonvolatile memory 10 includes a plurality of memory packages 100. Each of the plurality of memory packages 100 includes a plurality of memory dies (memory chips) 110. Each of the plurality of memory dies 110 includes a plurality of planes PLN. In this embodiment, storing (writing) data in the nonvolatile memory 10 is also called "non-volatilizing".

The memory controller 20 is a control apparatus that controls the nonvolatile memory 10. The memory controller 20 is, for example, a semiconductor integrated circuit formed as a SoC (System On a Chip). The memory controller 20 controls the nonvolatile memory 10 based on an instruction (request) received from the host device HD to execute a data read operation, a data write operation, a data erase operation, and the like. The memory controller 20 may collectively manage a plurality of the nonvolatile memories 10. The memory controller 20 is connected to the host device HD via a bus B1. The nonvolatile memory 10 is connected to the memory controller 20 via a bus B2. Note that the host device HD and the memory controller 20 may be connected via a network.

(a-2) Hardware Arrangement of Memory System MS (a-2-1) Hardware Arrangement of Nonvolatile Memory 10

Figure 2:
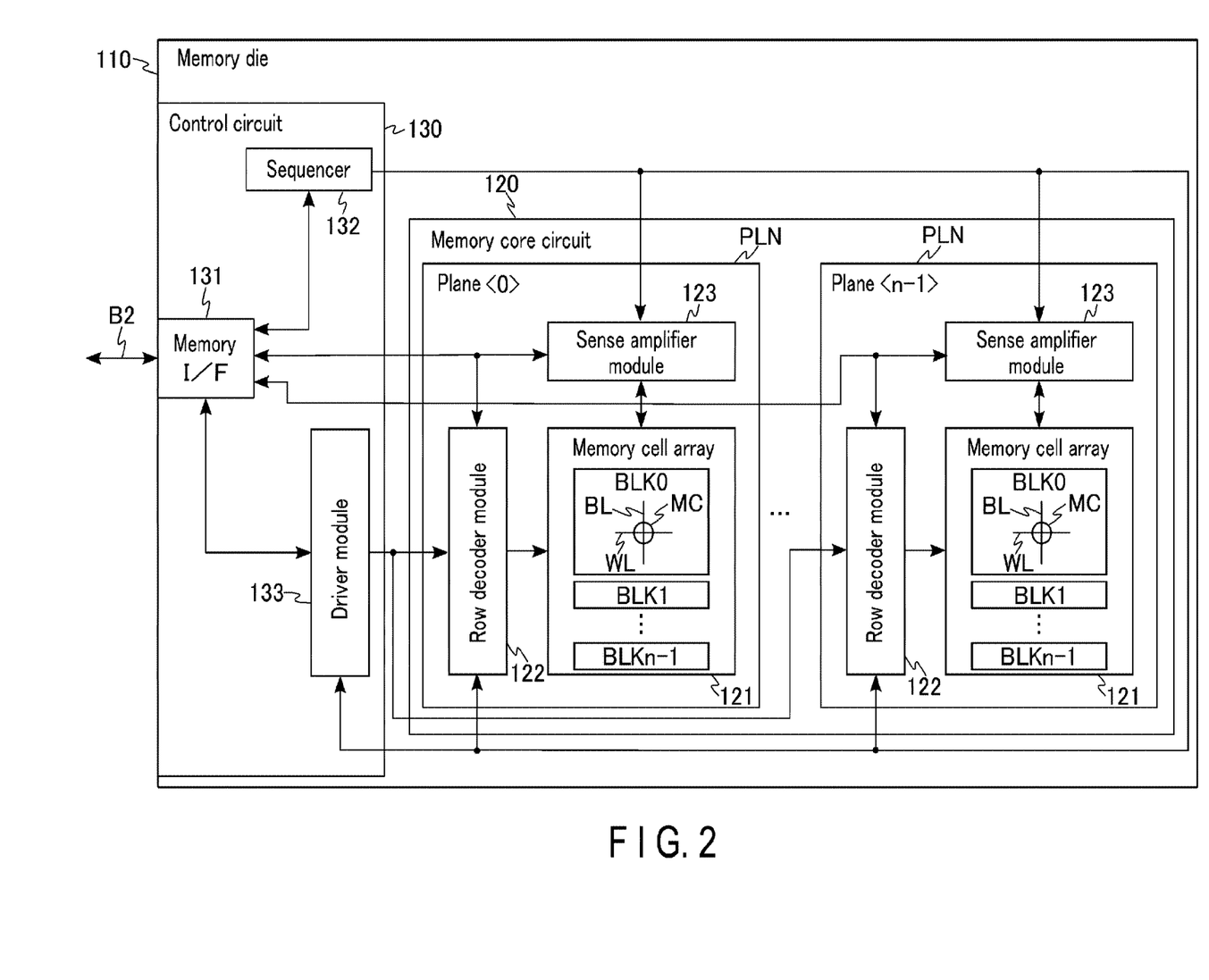
FIG. 2 is a view showing the arrangement of a nonvolatile memory of a memory system according to the first embodiment.

FIG. 2 is a block diagram showing an example of the hardware arrangement of the nonvolatile memory 10 according to this embodiment.

In one memory package 100 of the nonvolatile memory 10, each memory die 110 includes, for example, the plurality of planes PLN and a control circuit 130.

The plurality of planes PLN are circuits that can operate independently and in parallel (simultaneously). A set of the plurality of planes PLN can also be referred to as a memory core circuit 120.

The control circuit 130 is a set of a plurality of circuits that control operations of the plurality of planes PLN.

Each plane PLN includes a memory cell array 121, a row decoder module 122, and a sense amplifier module 123.

The memory cell array 121 is a storage circuit including a set of a plurality of memory cells MC. The plurality of memory cells MC may be two-dimensionally arranged, or may be three-dimensionally arranged.

The row decoder module 122 is a decoder that decodes a row address. The row decoder module 122 selects a row (one block BLK) of the memory cell array 121 based on the decoding result. The row decoder module 122 transfers a voltage to each of a plurality of interconnects (a word line WL and a bit line BL) provided in the selected block BLK.

The sense amplifier module 123 is a sense circuit that senses the data read from the selected block BLK based on the voltage of the bit line BL in a read operation. In the read operation, the sense amplifier module 123 transmits the read data to the memory controller 20 via the control circuit 130. In a write operation, the sense amplifier module 123 can apply, to each bit line BL, a voltage corresponding to the data to be written in the memory cell MC.

The memory cell array 121 includes a plurality of blocks BLK (BLK0 to BLKn−1). n is a natural number. The block BLK is used as, for example, a unit of data erase.

The block BLK includes a plurality of pages. The page is a unit of data read. The page is also a unit of data write. For example, the page corresponds to data to be stored in a plurality of memory cells MC connected to one word line WL. Note that a plurality of memory cells MC connected to one word line WL can store data of a plurality of pages in accordance with the bit number of data to be stored in each memory cell MC.

The block BLK includes a plurality of memory cells MC, a plurality of bit lines BL, and a plurality of word lines WL. Each memory cell MC nonvolatilely stores at least 1-bit data. Each memory cell MC is associated with one bit line BL and one word line WL. Each memory cell MC is identified based on the address for identifying the word line WL and the address for identifying the bit line BL.

The control circuit 130 includes a memory interface (memory I/F) 131, a sequencer 132, and a driver module 133.

The memory I/F 131 is a hardware interface connected to the memory controller 20 via the bus B2. The memory I/F 131 performs communication complying with an interface standard between the nonvolatile memory 10 and the memory controller 20. The interface standard supported by the memory I/F 131 is, for example, a NAND interface standard. For example, the memory I/F 131 sends a row address to each row decoder module 122. In a read operation, the memory I/F 131 receives read data from each sense amplifier module 123. In a write operation, the memory I/F 131 sends data to a certain sense amplifier module 123.

The sequencer 132 is a control circuit that controls the overall operation of the memory die 110. The sequencer 132 controls, based on a command receives via the memory I/F 131, the driver module 133, a plurality of row decoder modules 122, a plurality of sense amplifier modules 123, and the like to execute a read operation, a write operation, an erase operation, and the like.

The driver module 133 is a circuit that generates a voltage to be used in a read operation, a write operation, an erase operation, and the like. The driver module 133 is connected to respective row decoder modules 122 via a plurality of signal lines. Based on an address received via the memory I/F 131, the driver module 133 can change the voltage to be applied to each of the plurality of signal lines corresponding to the plurality of word lines WL and the plurality of bit lines BL.

In the memory space of the nonvolatile memory 10, the identification number (address value) of the memory package 100 corresponds to the upper address layer in the memory space. The identification number (address) of the plane PLN corresponds to the lower address layer in the memory space. The identification number (address) of the memory die 110 corresponds to the intermediate address layer between the layer of the memory package 100 and the layer of the plane PLN in the memory space.

(a-2-2) Hardware Arrangement of Memory Controller 20

Figure 3:
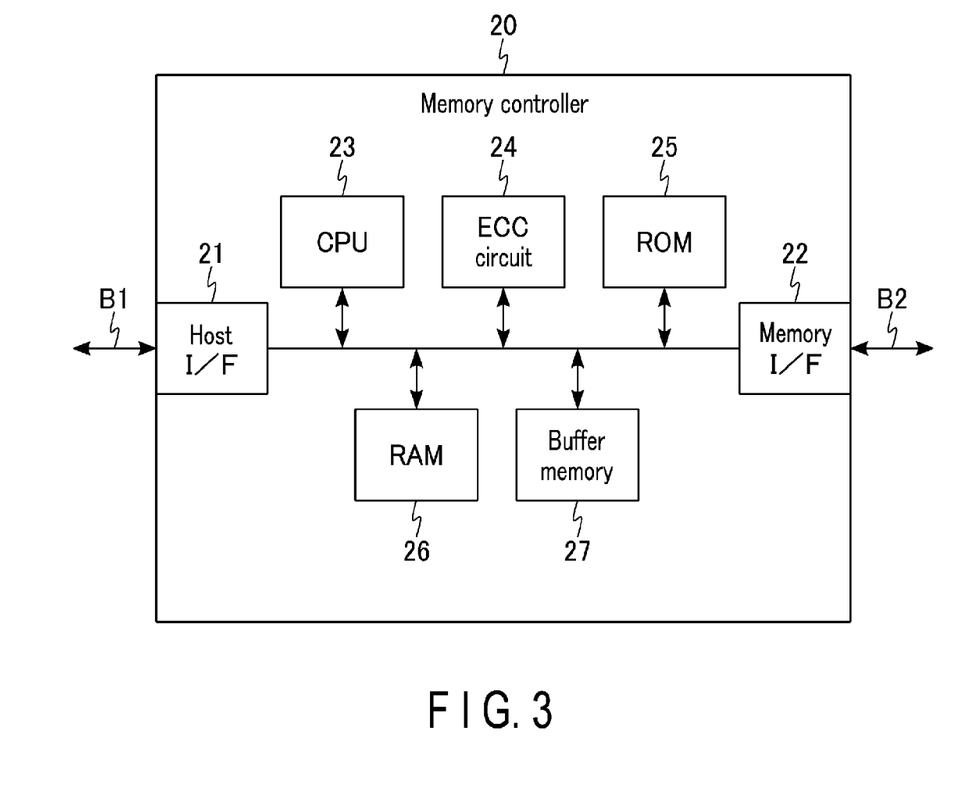
FIG. 3 is a view showing the arrangement of a memory controller of the memory system according to the first embodiment.

FIG. 3 is a block diagram showing an example of the hardware arrangement of the memory controller 20 according to this embodiment.

The memory controller 20 according to this embodiment includes a host interface (host I/F) 21, a memory interface (memory I/F) 22, a CPU (Central Processing Unit) 23, an ECC (Error Correction Code) circuit 24, a ROM (Read Only Memory) 25, a RAM (Random Access Memory) 26, and a buffer memory 27.

The host interface I/F 21 is a hardware interface connected to the host device HD via the bus B1. The host I/F 21 performs communication complying with an interface standard between the host device HD and the memory controller 20. The host I/F 21 supports the interface standard such as SATA (Serial Advanced Technology Attachment), PCIe™ (PCI Express), or the like.

The memory I/F 22 is a hardware interface connected to the nonvolatile memory 10 via the bus B2. The memory I/F 22 performs communication complying with an interface standard between the nonvolatile memory 10 and the memory controller 20. The interface standard supported by the memory I/F 22 is, for example, the NAND interface standard.

The CPU 23 is a processor. The CPU 23 controls the overall operation of the memory controller 20. In accordance with a write request received via the host I/F 21, the CPU 23 instructs the nonvolatile memory 10 via the memory I/F 22 to write data. In accordance with a read request received via the host I/F 21, the CPU 23 instructs the nonvolatile memory 10 via the memory I/F 22 to read data.

The ECC circuit 24 is a circuit that executes an ECC process. The ECC process includes data encoding and data decoding. The ECC circuit 24 encodes data to be written in the nonvolatile memory 10. The ECC circuit 24 decodes data read from the nonvolatile memory 10.

The ROM 25 is a nonvolatile memory. The ROM 25 is, for example, an EEPROM™ (Electrically Erasable Programmable Read-Only Memory). The ROM 25 stores a program such as firmware. For example, the operation of the memory controller 20 to be described later is implemented by the CPU 23 executing the firmware of the ROM 25.

The RAM 26 is a volatile memory. The RAM 26 is, for example, a DRAM (Dynamic Random Access Memory) or an SRAM (Static Random Access Memory). The RAM 26 is used as the work area of the CPU 23. The RAM 26 stores a management table such as a lookup table (LUT) which associates a logical address and a physical address. The management table is one kind of system data of the memory system MS. The LUT may be referred to as a "address conversion table" or a "logical address/physical address conversion table".

The buffer memory 27 is a volatile memory. The buffer memory 27 is a DRAM (Dynamic Random Access Memory), an SRAM (Static Random Access Memory), or the like. The buffer memory 27 temporarily stores data received via the host I/F 21 and data receives via the memory I/F 22. The buffer memory 27 may be externally connected to the memory controller 20.

(a-2-3) Functional Arrangements of Nonvolatile Memory 10 and Memory Controller 20

Figure 4:
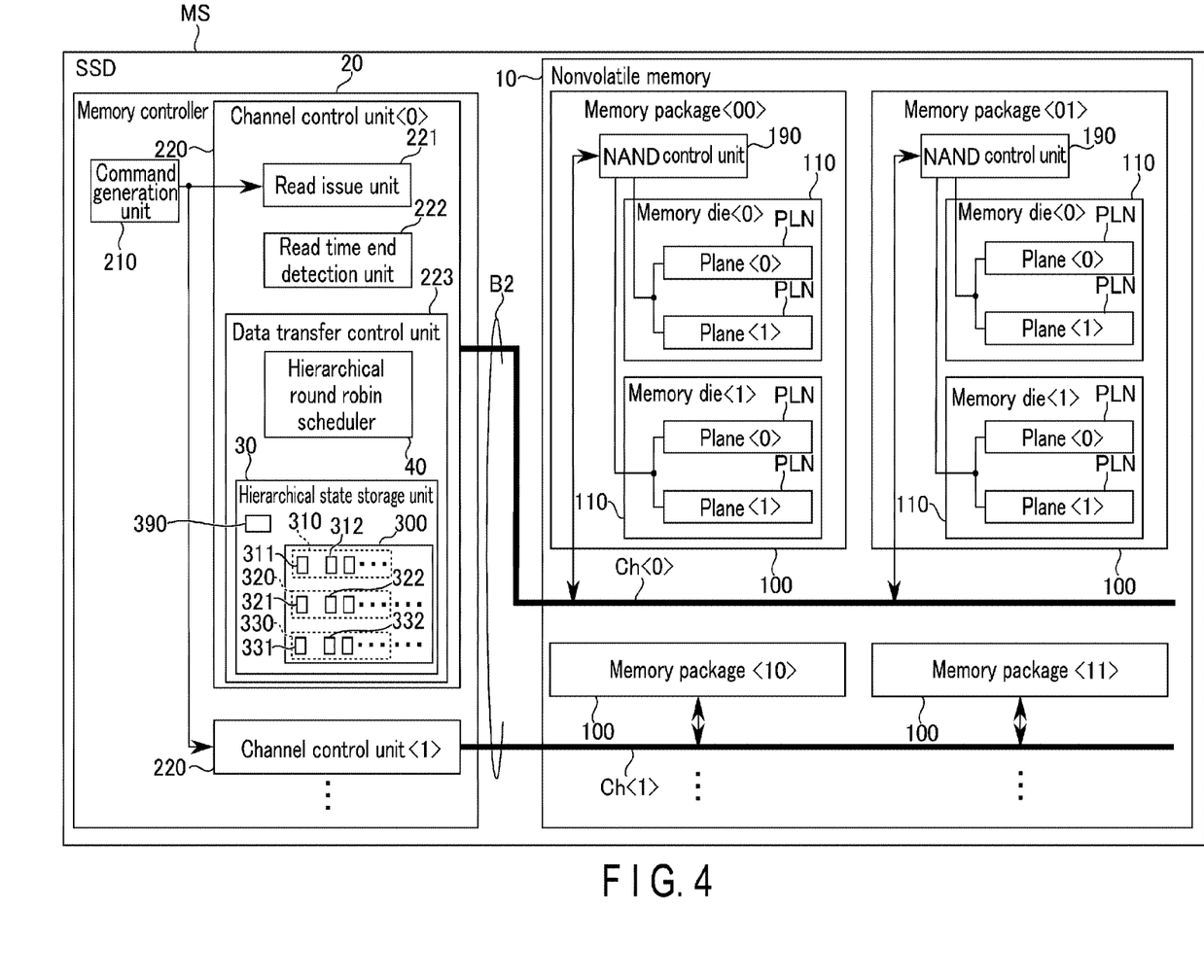
FIG. 4 is a view showing the functional arrangement of the memory system according to the first embodiment.

FIG. 4 is a block diagram showing an example of the functional arrangements of the nonvolatile memory 10 and the memory controller 20.

As has been described above, the nonvolatile memory 10 includes the plurality of memory packages 100. The plurality of memory packages 100 are connected to the memory controller 20 via channels Ch (Ch0, Ch1, . . . ), respectively. A given number (for example, two) of memory packages 100 are connected to one channel Ch. A set of a plurality of channels Ch is the bus B2.

Each memory package 100 includes the plurality of memory dies 110 and a NAND control unit 190. One memory package includes, for example, two memory dies 110. However, the memory package 100 may include three or more memory dies 110.

Each memory die 110 includes the plurality of planes PLN. One memory die 110 includes, for example, two planes PLN. However, the memory die 110 may include three or more planes PLN. Each plane PLN independently executes an operation sequence in accordance with a command.

The NAND control unit 190 is a functional block representing a set of the control circuits 130 of the plurality of memory dies 110. The NAND control unit 190 controls various kinds of operations of the plurality of planes PLN of the memory package 100. In a read operation, the NAND control unit 190 sends data read from the plane PLN to the memory controller 20. In a write operation, the NAND control unit 190 sends, to the plane PLN, data to be written in the nonvolatile memory 10.

The memory controller 20 includes a command generation unit 210 and a plurality of channel control units 220.

The command control unit 210 is a functional block that generates a command.

Each channel control unit 220 is a functional block that controls corresponding one of the plurality of channels Ch.

The channel control unit 220 includes a read issue unit 221, a read time end detection unit 222, and a data transfer control unit 223.

The read issue unit 221 issues, based on a command, a read command to each of the plurality of memory packages 100 belonging to the channel Ch.

The read time end detection unit 222 detects, from the plurality of planes PLN, the plane PLN whose read time has ended. The read time (read period) is a period from the start to the completion of the read operation of the plane PLN. The plane PLN whose read time has ended is the plane PLN capable of data transfer in the read operation or the plane PLN waiting for a data transfer instruction. For example, based on various kinds of functions, the read time end detection unit 222 can monitor the operation state of the memory package 100, the operation state of the memory die 110, and the operation state of the plane PLN via the NAND control unit 190. Based on the monitor result, the read time end detection unit 222 detects the plane PLN whose read time has ended (the plane capable of data transfer). For example, the read time end detection unit 222 notifies a hierarchical state storage unit 30 (to be described later) of the plane PLN whose read time has ended.

The data transfer control unit (to be also referred to as a data out control unit) 223 controls the order of transfer of data (output of data) read from the planes PLN of the respective memory packages 100 by round robin processing. When selecting the plane PLN to execute data transfer in the next cycle from a plurality of planes PLN capable of data transfer, the data transfer control unit 223 preferentially selects, by round robin processing, the plane PLN belonging to the memory package 100 (or the memory die 110) different from the memory package 100 (or the memory die 110) to which the plane PLN currently during data transfer belongs. The data transfer control unit 223 is formed from, for example, software, hardware, or a combination of software and hardware.

The data transfer control unit 223 includes the hierarchical state storage unit 30 and a hierarchical round robin scheduler 40.

The hierarchical state storage unit 30 stores various kinds of information concerning data transfer in the layer in each of the layer including the plurality of memory packages 100, the layer including the plurality of memory dies 110, and the layer including the plurality of planes PLN. For example, based on a notification from the read time end detection unit 222, the hierarchical state storage unit 30 stores the read time end state (data transfer propriety or data transfer waiting) of each memory package 100, the read time end state of each memory die 110, and the read time end state of the plane PLN. Here, the state of the end of the read operation indicates the state in which data read from the plane can be transferred to the memory controller 20 depending on whether the read time has ended. Further, the hierarchical state storage unit 30 can send the stored information to the channel control unit 220 and/or the hierarchical round robin scheduler 40.

The hierarchical round robin scheduler (to be also referred to as the round robin control unit) 40 controls execution timings of various kinds of processes for the round robin processing, execution periods of various kinds of operations, and various kinds of settings. For example, based on the information of the hierarchical state storage unit 30, the hierarchical round robin scheduler 40 hierarchically searches for the memory package 100 capable of data transfer, the memory die 110 capable of data transfer, and the plane PLN capable of data transfer. Based on the search result by the round robin processing, the hierarchical round robin scheduler 40 detects the plane PLN capable of data transfer. Based on the detection result, the hierarchical round robin scheduler 40 selects the plane PLN to execute data transfer. The hierarchical round robin scheduler 40 controls data transfer from the selected plane PLN.

The hierarchical state storage unit 30 includes a register area 300 and a logical operation unit 390.

Information is stored in the register area 300.

The logical operation unit 390 executes a logical operation (for example, OR operation) of the values of registers 322 and 332. The logical operation unit 390 may be provided outside the hierarchical state storage unit 30 as a component of the data transfer control unit 223.

The register area 300 includes a channel corresponding unit 310.

The channel corresponding unit 310 is provided with respect to the corresponding channel Ch between the nonvolatile memory 10 and the memory controller 20. The channel corresponding unit 310 stores information concerning the data transfer propriety states of the plurality of memory packages 100 of the corresponding channel Ch in the round robin processing.

The channel corresponding unit 310 includes a register 311, a plurality of registers 312, and a plurality of memory package corresponding units 320.

The register 311 stores information (for example, the identification number or address value of the memory package 100) indicating the memory package 100, among the plurality of memory packages 100, which is the monitor target memory package 100 in the round robin processing in the layer of the memory package 100 of the corresponding channel Ch.

Each of the plurality of registers 312 stores information indicating whether the read time of the corresponding memory package 100 has ended (whether data transfer is possible) in the layer of the memory package 100.

For example, if a given memory package 100 is in a state in which data transfer is impossible (in a state in which the plurality of memory dies 110 of the memory package 100 do not include the plane PLN whose read time has ended), the register 312 corresponding to the given memory package 100 stores a first value (N). The first value is, for example, 1-bit data. The 1-bit data means "0" data or "1" data.

Alternatively, for example, if the given memory package 100 is in a state in which data transfer is possible (in a state in which at least one memory die 110 of the memory package 100 includes the plane PLN whose read time has ended), the register 312 corresponding to the given memory package 100 stores a second value (Y) different from the first value. The second value is, for example, 1-bit data. The 1-bit data means "0" data or "1" data.

Further, for example, the value of the register 312 concerning the given memory package 100 is decided based on the result of the logical operation of the values of the plurality of registers 322 concerning the memory dies 110 belonging to the given memory package 100. The logical operation executed on the values of the plurality of registers 322 is, for example, a logical sum operation (OR operation).

The plurality of memory package corresponding units 320 correspond to the plurality of memory packages 100 belonging to the channel Ch, respectively. Each of the plurality of memory package corresponding units 320 stores information concerning the data transfer propriety states of the plurality of memory dies 110 of the corresponding memory package 100 in the round robin processing.

Each memory package corresponding unit 320 includes a register 321 and a plurality of the registers 322.

The register 321 stores information (for example, the identification number or address value of the memory die 110) indicating the memory die 110, among the plurality of memory dies 110, which is the monitor target memory die 110 in the round robin processing in the layer of the memory die 110 of the corresponding memory package 100.

Each of the plurality of registers 322 stores information indicating whether the read time of the corresponding memory die 110 has ended in the layer of the memory die 110.

For example, if a given memory die 110 is in a state in which data transfer is impossible (in a state in which the given memory die 110 does not include the plane PLN whose read time has ended), the register 322 corresponding to the given memory die 110 stores a third value (N). The third value is, for example, 1-bit data.

Alternatively, for example, if the given memory die 110 is in a state in which data transfer is possible (in a state in which the given memory die 110 includes the plane PLN whose read time has ended), the register 322 corresponding to the given memory die 110 stores a fourth value (Y) different from the third value. The fourth value is, for example, 1-bit data.

Further, for example, the value of the register 322 concerning the given memory die 110 is decided based on the result of the logical operation of the values of the plurality of registers 332 concerning the planes PLN belonging to the given memory die 110. The logical operation executed on the values of the plurality of registers 332 is, for example, a logical sum operation (OR operation).

Each memory package corresponding unit 320 includes a plurality of memory die corresponding units 330.

The plurality of memory die corresponding units 330 correspond to the plurality of memory dies 110 belonging to the memory package 100, respectively. Each of the plurality of memory die corresponding units 330 stores information concerning the data transfer propriety states of the plurality of planes PLN of the corresponding memory die 110 in the round robin processing.

Each memory die corresponding unit 330 includes a register 331 and a plurality of the registers 332.

The register 331 stores information (for example, the identification number or address value of the plane PLN) indicating the plane PLN, among the plurality of planes PLN, which is the monitor target plane PLN in the round robin processing in the layer of the plane PLN of the corresponding memory die 110.

Each of the plurality of registers 332 stores information indicating whether the read time of the corresponding plane PLN has ended in the layer of the plane PLN.

For example, if a given plane PLN is in a state in which data transfer is impossible (in a state in which the read time has not ended), the register 332 corresponding to the given plane PLN stores a fifth value (N). The fifth value is, for example, 1-bit data.

Alternatively, for example, if the given plane PLN is in a state in which data transfer is possible (in a state in which the read time has ended), the register 332 corresponding to the given plane PLN stores a sixth value (Y) different from the fifth value. The sixth value is, for example, 1-bit data.

Further, for example, if a read time (tR) of the given plane PLN ends, the value of the register 332 corresponding to the given plane PLN is changed from the fifth value to the sixth value. If the register 332 has the sixth value, the plane PLN corresponding to this register 332 is in a state of waiting for data transfer (in the state in which data transfer is possible). If data transfer of the plane PLN capable of data transfer is complete, the value of the register 332 corresponding to this plane PLN is changed from the sixth value to the fifth value.

(b) Operation

Figure 5:
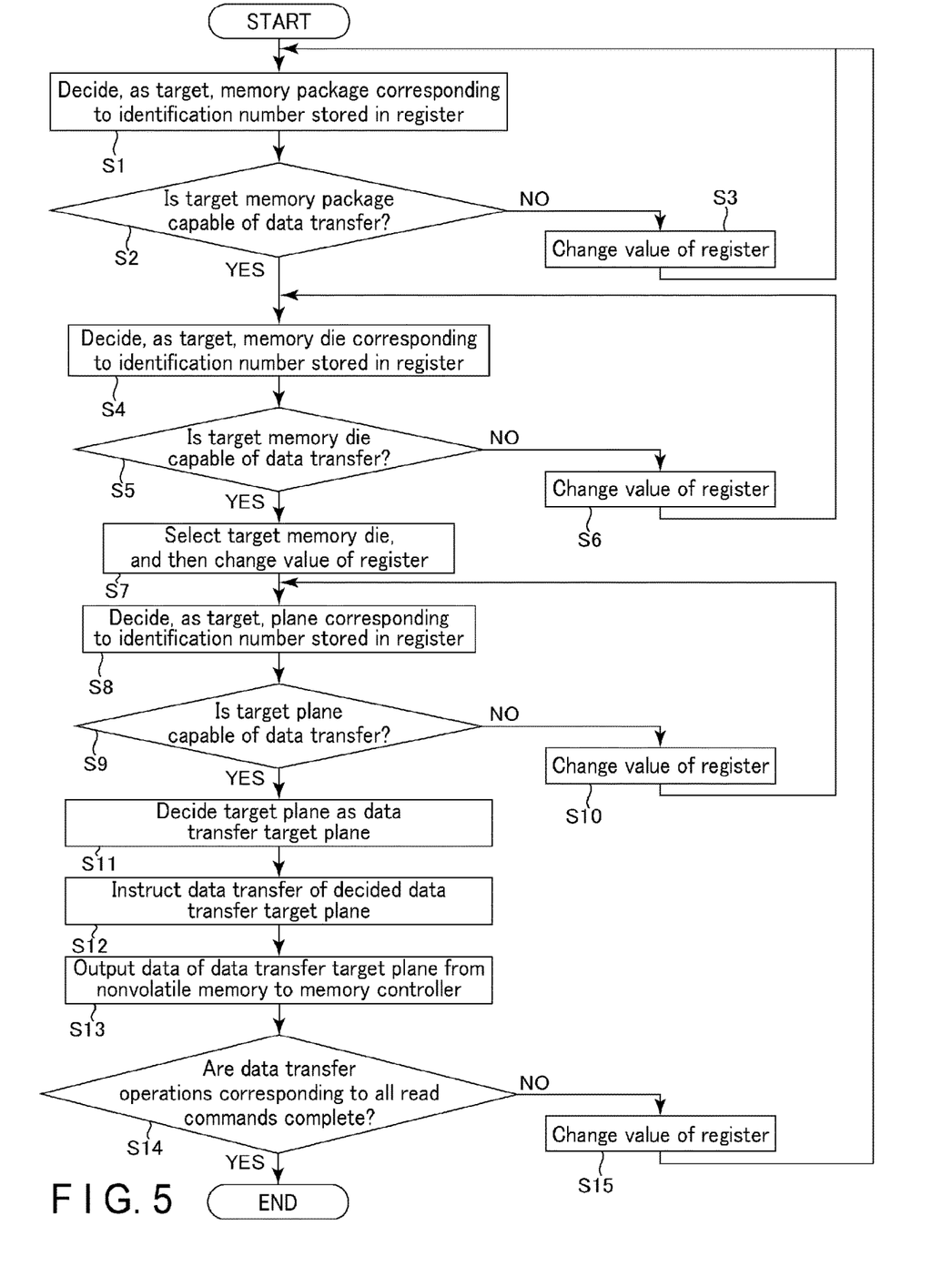
FIG. 5 is a flowchart illustrating the operation of the memory system according to the first embodiment.

FIG. 5 is a flowchart illustrating the operation of the memory system MS according to the first embodiment.

The memory controller 20 executes round robin processing for a plurality of data transfers from the nonvolatile memory 10.

The data transfer control unit 223 of the memory controller 20 hierarchically monitors, by the hierarchical round robin scheduler 40, the memory spaces of the corresponding memory packages 100 for the read time end states (data transfer proprieties) of the plurality of memory packages 100, the read time end states of the plurality of memory dies 110, and the read time end states of the plurality of planes PLN based on the information (data) of the hierarchical state storage unit 30.

Here, the round robin processing and data transfer of the channel control unit 220 and the memory package 100 concerning one channel Ch (for example, channel Ch<0>) will be described.

At the start timing of data transfer or during data transfer form a given plane PLN, the hierarchical round robin scheduler 40 decides, as the target of determination as to data transfer propriety, the memory package 100 corresponding to the identification number stored in the register 311 (S1). If no identification number is stored in the register 311, the hierarchical round robin scheduler 40 decides, as the target, the memory package 100 of a given identification number (i) belonging to the channel Ch<0>. i is an integer equal to or larger than 0. For example, if one memory package 100 is in execution of data transfer, the memory package 100 different from the memory package 100 in execution of data transfer is decided as the target. If no identification number is stored in the register 311, the hierarchical round robin scheduler 40 stores the identification number of the target memory package 100 in the register 311.

The hierarchical round robin scheduler 40 determines whether the target memory package 100 is in a state in which data transfer is possible (S2). The information indicating whether the target memory package 100 is in the state in which data transfer is possible is stored in the corresponding register 312.

If the target memory package 100 is not in the state in which data transfer is possible (S2 NO), the hierarchical round robin scheduler 40 increments (adds 1) or decrements (subtracts 1) the value of the register 311 (S3). With this operation, the hierarchical round robin scheduler 40 changes the value of the register 311. After this, the hierarchical round robin scheduler 40 performs processing in S1.

If the target memory package 100 is in the state in which data transfer is possible (S2 YES), the hierarchical round robin scheduler 40 decides, as the target of determination as to data transfer propriety, the memory die 110 corresponding to the identification number stored in the register 321 among the plurality of memory dies 110 belonging to the target memory package 100 (S4). If no identification number is stored in the register 321, the hierarchical round robin scheduler 40 decides, as the target, the memory die 110 of a given identification number (j). j is an integer equal to or larger than 0. If no identification number is stored in the register 321, the hierarchical round robin scheduler 40 stores the identification number of the target memory die 110 in the register 321.

The hierarchical round robin scheduler 40 determines whether the target memory die 110 is in a state in which data transfer is possible (S5). The information indicating whether the target memory die 110 is in the state in which data transfer is possible is stored in the corresponding register 322.

If the target memory die 110 is not in the state in which data transfer is possible (S5 NO), the hierarchical round robin scheduler 40 increments or decrements the value of the register 321 (S6). With this operation, the hierarchical round robin scheduler 40 changes the value of the register 321. After this, the hierarchical round robin scheduler 40 newly (again) performs processing in S4.

If the target memory die 110 is in the state in which data transfer is possible (S5 YES), the hierarchical round robin scheduler 40 selects the target memory die 110, and then increments or decrements the value of the register 321 (S7). In this manner, the hierarchical round robin scheduler 40 changes the value of the register 321. With this operation, even in a situation in which a plurality of read operations are successively executed, it is possible to suppress that the memory die 110 of the same identification number is successively selected.

The hierarchical round robin scheduler 40 decides, as the target of determination as to data transfer propriety, the plane PLN corresponding to the identification number stored in the register 331 among the plurality of planes PLN belonging to the selected memory die 110 (S8). If no identification number is stored in the register 331, the hierarchical round robin scheduler 40 decides, as the target, the plane PLN of a given identification number (k). k is an integer equal to or larger than 0. If no identification number is stored in the register 331, the hierarchical round robin scheduler 40 stores the identification number of the target plane PLN in the register 331.

The hierarchical round robin scheduler 40 determines whether the target plane PLN is in a state in which data transfer is possible (S9). The information indicating whether the target plane PLN is in the state in which data transfer is possible is stored in the corresponding register 332.

If the target plane PLN is not in the state in which data transfer is possible (S9 NO), the hierarchical round robin scheduler 40 increments or decrements the value of the register 331 (S10). With this operation, the hierarchical round robin scheduler 40 changes the value of the register 331. After this, the hierarchical round robin scheduler 40 newly (again) performs processing in S8.

If the target plane PLN is in the state in which data transfer is possible (S9 YES), the hierarchical round robin scheduler 40 decides the target plane PLN as the data transfer target plane PLN (S11). The hierarchical round robin scheduler 40 may change the value of the register 331 after the data transfer target plane PLN is decided. With this operation, even in a situation in which a plurality of read operations are successively executed, it is possible to suppress that the planes PLN of the same identification number are successively selected.

The hierarchical round robin scheduler 40 instructs the data transfer control unit 223 to perform data transfer of the decided data transfer target plane PLN (S12).

If data transfer is instructed, the data transfer control unit 223 causes the nonvolatile memory 10 to output data of the data transfer target plane PLN to the memory controller 20 (S13). The data is output to the memory controller 20 via the NAND control unit 190 and the channel Ch. After the data transfer of the data transfer target plane PLN is complete, the information indicating the state in which data transfer is impossible is stored in the register 332 corresponding to the data transfer target plane PLN.

After the data transfer of the data transfer target plane PLN is complete, the hierarchical round robin scheduler 40 checks whether data transfer operations corresponding to all read commands have been complete (S14).

If data transfer operations corresponding to all read commands have not been complete (S13 NO), the hierarchical round robin scheduler 40 increments or decrements the value of the register 311 (S15). After this, the hierarchical round robin scheduler 40 performs processing in S1.

If data transfer operations corresponding to all read commands have been complete (S13 YES), the memory controller 20 ends a series of processing shown in FIG. 5 (end).

Figure 6:
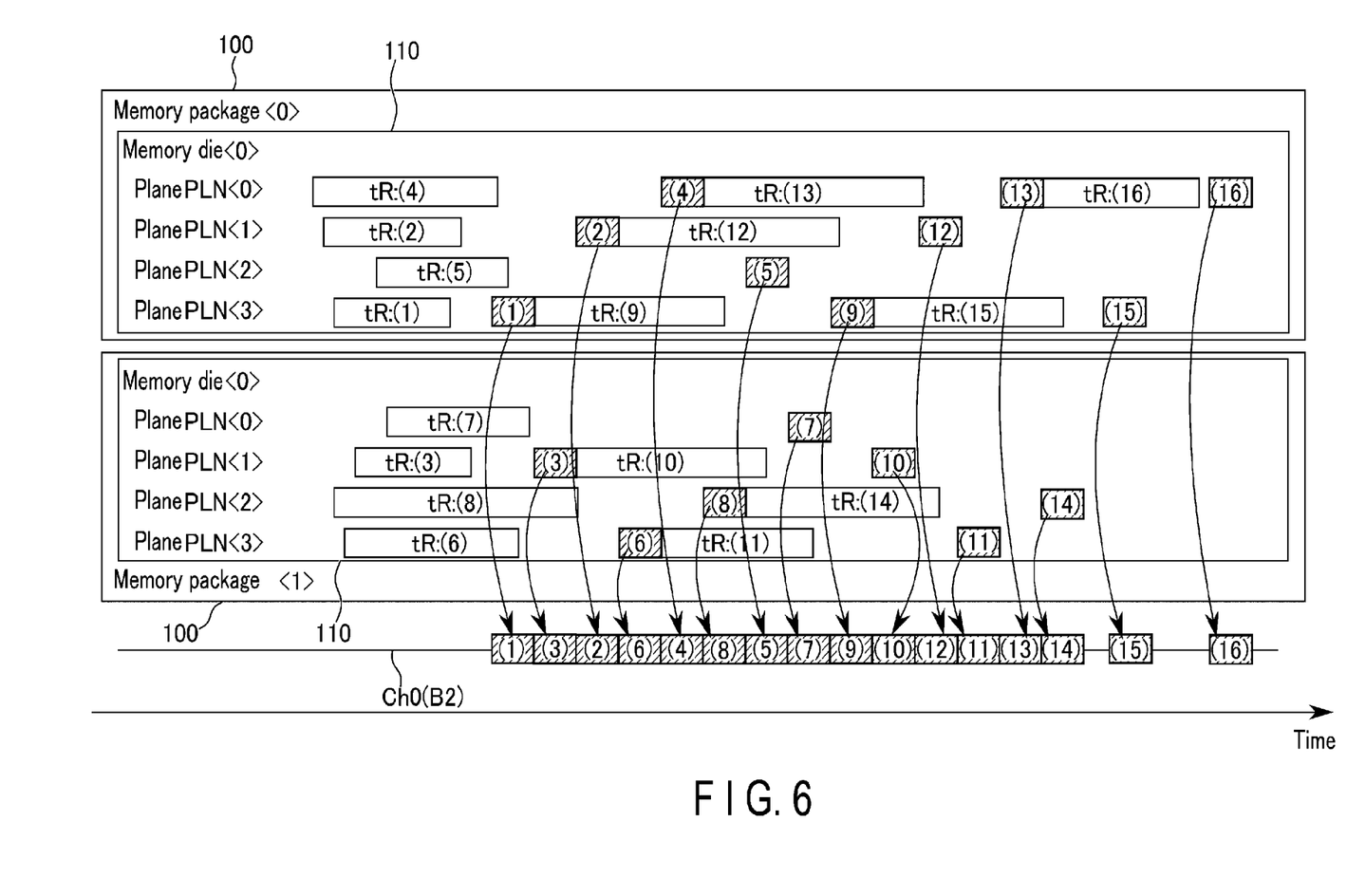
FIG. 6 is a view for explaining the effect of the memory system according to the first embodiment.

FIG. 6 is a view schematically showing a data transfer process using the round robin processing to control the order of data transfer in the memory system MS according to this embodiment. FIG. 6 shows an example in which two memory packages 100 execute data transfer in parallel. In FIG. 6, "(1), (2), (3), . . . , (15), (16)" indicate the order of the end of the read time.

By controlling the order of data transfer by the round robin processing, data (a plurality of data items) is output from each of the plurality of memory packages 100 to the channel Ch (bus B2).

In this embodiment, at the time of completion of preceding data transfer of the plane PLN of a given memory package 100, the plane PLN of the memory package 100 different from the memory package 100 executing the preceding data transfer is selected from one or more planes PLN capable of data transfer.

Therefore, in this embodiment, data transfer of the plane PLN whose read time tR has ended is executed alternately between the two memory packages 100 without depending on the order of the end of the read time tR of data in each memory package 100. If two successive data transfer operations are executed in different memory packages 100, respectively, a data output wait time tWHR2 is not generated.

As a result, the memory system MS according to this embodiment can suppress generation of the wait time tWHR2 between data transfer operations.

Hence, the memory system MS according to this embodiment can shorten the period until a plurality of data transfer operations are complete.

If the plurality of memory dies 110 of one memory package 100 transfer data in parallel according to data transfer based on the order set by round robin processing, the plane PLN of the memory die 110 different from the memory die 110 executing preceding data transfer is selected as the next data transfer target. After the preceding data transfer of one memory die 110 is complete, data transfer of the other memory die 110 is executed by the selected plane PLN.

(c) Effect

The memory system MS according to the first embodiment cyclically searches for, by round robin processing, the memory package 100, the memory die 110, and the plane PLN to be the target of data transfer following data transfer in the previous cycle for each memory package 100 and for each memory die 110. With this, the memory system MS according to the first embodiment can ensure that the plane PLN capable of execution of data transfer is selected as the data transfer target within a certain number of cycles. Accordingly, the memory system MS according to the first embodiment can ensure the upper limit of the latency of data transfer.

(d) Summary

If the unit capable of data transfer is hierarchically searched for in the order of the memory packet 100, the memory die 110, and the plane PLN by round robin processing, a plurality of memory packages 100 having different identification numbers and/or the memory dies 110 having different identification numbers tend to be sequentially (alternately) selected as the data transfer target. Thus, successive data transfer operations from the memory packages 100 of the same identification number and/or the memory dies 110 of the same identification number can be relatively avoided. As a result, in the memory system MS according to the first embodiment, generation of the wait time between a plurality of data transfer operations is suppressed. Therefore, the memory system MS according to the first embodiment can shorten the time for data transfer. The memory system MS according to the first embodiment can efficiently execute data transfer. The memory system MS according to the first embodiment can improve the performance of the memory system.

(2) Second Embodiment (a) Arrangement

Figure 7:
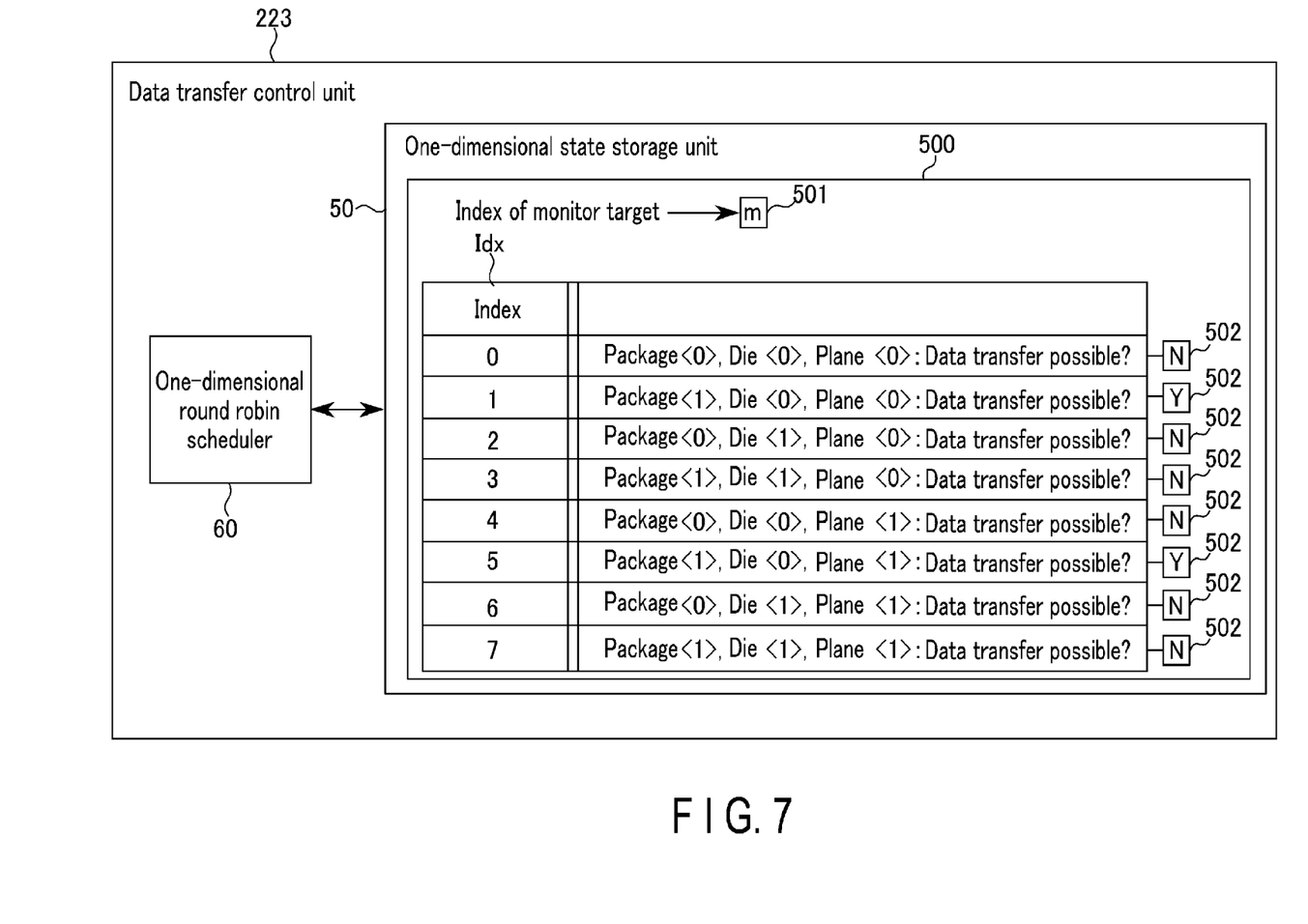
FIG. 7 is a view showing the functional arrangement of a memory system according to the second embodiment.

FIG. 7 is a view schematically showing the arrangement of a memory system MS according to the second embodiment.

In the second embodiment, an index (identification number) Idx is assigned to each minimum unit of the data output target. For example, each of a plurality of planes PLN included in a nonvolatile memory 10 is the minimum unit of the data output target.

In the example shown in FIG. 7, two memory packages 100 belong to one channel Ch in the nonvolatile memory 10. One memory package 100 includes two memory dies 110. One memory die 110 includes two planes PLN.

In this case, the index Idx is assigned to each of the plurality of planes PLN each serving as the unit of data transfer as follows.

The index Idx "0" is assigned to the plane PLN "0" belonging to the memory package 100 of the identification number "0" and the memory die 110 of the identification number "0".

The index Idx "1" is assigned to the plane PLN "0" belonging to the memory package 100 of the identification number "1" and the memory die 110 of the identification number "0".

The index Idx "2" is assigned to the plane PLN "0" belonging to the memory package 100 of the identification number "0" and the memory die 110 of the identification number "1".

The index Idx "3" is assigned to the plane PLN "0" belonging to the memory package 100 of the identification number "1" and the memory die 110 of the identification number "1".

The index Idx "4" is assigned to the plane PLN "1" belonging to the memory package 100 of the identification number "0" and the memory die 110 of the identification number "0".

The index Idx "5" is assigned to the plane PLN "1" belonging to the memory package 100 of the identification number "1" and the memory die 110 of the identification number "0".

The index Idx "6" is assigned to the plane PLN "1" belonging to the memory package 100 of the identification number "0" and the memory die 110 of the identification number "1".

The index Idx "7" is assigned to the plane PLN "1" belonging to the memory package 100 of the identification number "1" and the memory die 110 of the identification number "1".

Two adjacent indices Idx are associated with the memory packages 100 of different identification numbers, respectively.

For example, the array of a plurality of indices Idx is set based on a numeral value having the number of the plane PLN as the most significant digit, the number of the memory package 100 as the least significant digit, and the number of the memory die 110 as the digit between the digit expressed by the number of the plane PLN and the digit expressed by the number of the memory package 100.

In this manner, in accordance with the number of the planes PLN in one memory package 100, eight indices Idx are set for round robin processing concerning data transfer.

In this embodiment, a data transfer control unit 223 includes a one-dimensional state storage unit 50 and a one-dimensional round robin scheduler 60.

The one-dimensional state storage unit 50 includes a register area 500. The register area 500 includes a plurality of registers 501 and 502. The register 501 stores the value (m) of the index Idx of the monitor target. m is an integer equal to or larger than 0.

Each of the plurality of registers 502 stores the value indicating whether the plane PLN corresponding to the corresponding index Idx is capable of data transfer. The value of the register 502 is controlled by, for example, a read time end detection unit 222.

If the read time of the plane PLN of the corresponding index Idx has not ended (data transfer is impossible), the register 502 stores a seventh value (N). The seventh value is 1-bit data ("0" data or "1" data).

If the read time of the plane PLN of the corresponding index Idx has ended (data transfer is possible or data transfer is waited), the register 502 stores an eighth value (Y) different from the seventh value. The eighth value is 1-bit data ("0" data or "1" data).

The one-dimensional round robin scheduler (round robin control unit) 60 sets the value of the index Idx of the monitor target in the register 501.

Based on the values of the plurality of registers 502, the one-dimensional round robin scheduler 60 monitors whether the plane PLN corresponding to the index Idx of the monitor target is capable of data transfer.

For example, the one-dimensional round robin scheduler 60 can control data transfer from each plane of the nonvolatile memory 10.

(b) Operation

Figure 8:
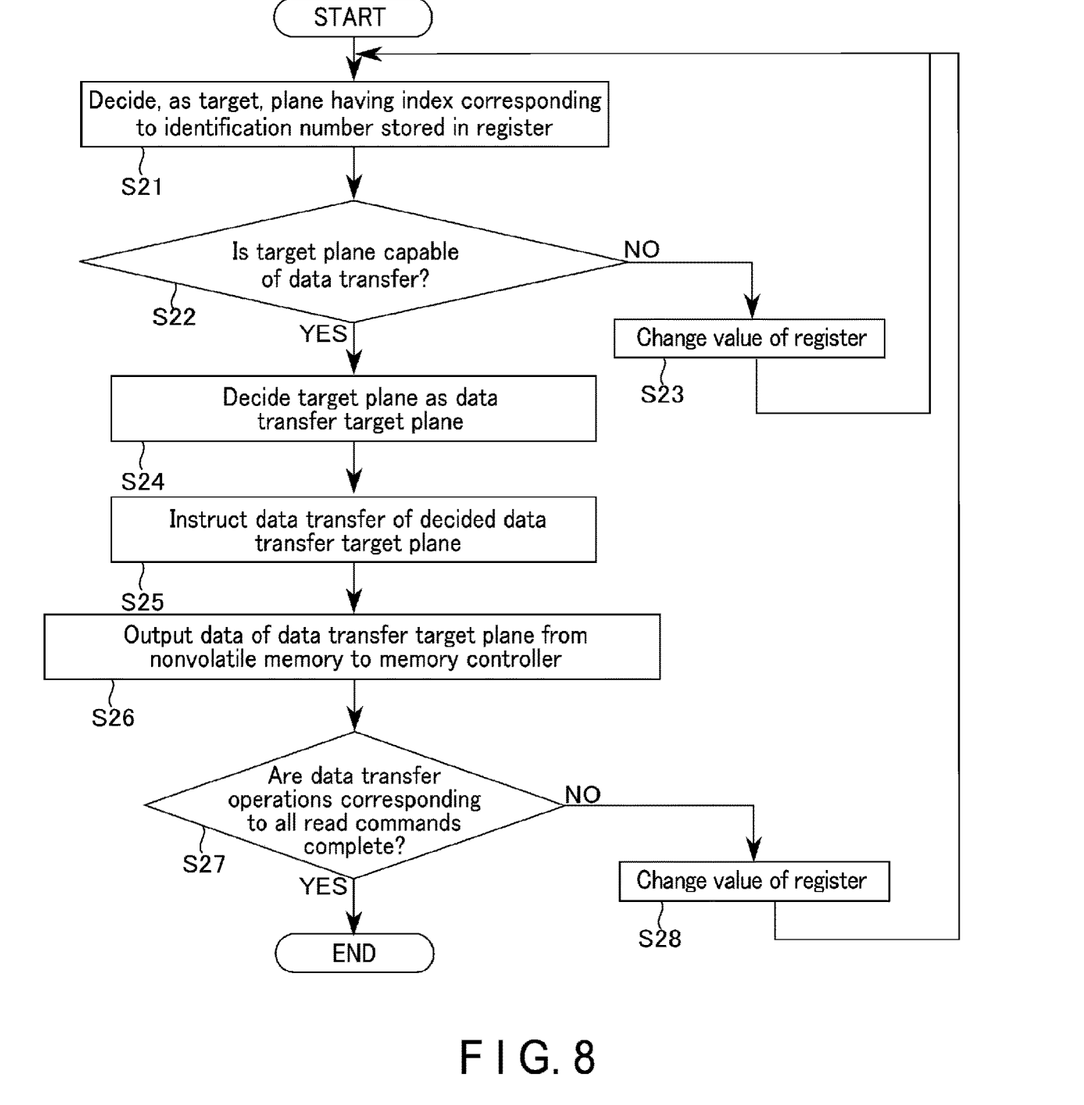
FIG. 8 is a flowchart illustrating the operation of the memory system according to the second embodiment.

FIG. 8 is a flowchart illustrating the operation of the memory system MS according to the second embodiment.

At the start timing of data transfer or during data transfer from a given plane PLN, the one-dimensional round robin scheduler 60 decides, as the target, the plane PLN having the index Idx corresponding to the identification number stored in the register 501 (S21).

The one-dimensional round robin scheduler 60 determines whether the target plane PLN is capable of data transfer (S22).

If the target plane PLN is not capable of data transfer (S22 NO), the one-dimensional round robin scheduler 60 increments or decrements the value of the register 501 to change the value (S23). After this, the one-dimensional round robin scheduler 60 newly (again) performs processing in S21.

If the target plane PLN is capable of data transfer (S22 YES), the one-dimensional round robin scheduler 60 decides the target plane PLN as the data transfer target plane PLN (S24).

The one-dimensional round robin scheduler 60 instructs the data transfer control unit 223 to perform data transfer of the decided data transfer target plane PLN (S25).

If data transfer is instructed, the data transfer control unit 223 causes the nonvolatile memory 10 to output data of the data transfer target plane PLN to a memory controller 20 (S26).

After the data transfer of the data transfer target plane PLN is complete, the one-dimensional round robin scheduler 60 checks whether data transfer operations corresponding to all read commands have been complete (S27).

If data transfer operations corresponding to all read commands have not been complete (S27 NO), the one-dimensional round robin scheduler 60 changes the value of the register 501 (S28). After this, the one-dimensional round robin scheduler 60 newly (again) performs processing in S21.

If data transfer operations corresponding to all read commands have been complete (S27 YES), the memory controller 20 ends a series of processing shown in FIG. 8 (end).

(c) Summary

In the memory system MS according to the second embodiment, data transfer of the nonvolatile memory 10 is managed on the basis of the units of the planes PLN assigned with different indices Idx. With this, the memory system MS according to the second embodiment can relatively easily control the order of a plurality of data transfer operations from the nonvolatile memory 10.

In the memory system MS according to the second embodiment, the plurality of planes PLN are searched for in a given cycle corresponding to the number of the indices Idx. Therefore, in the second embodiment, each of the plurality of planes PLN can be reliably selected as the data transfer target. Accordingly, the memory system MS according to the second embodiment can ensure the upper limit of the latency of data transfer.

The memory system MS according to the second embodiment can reduce the number of the registers 501 that store the identification number of the monitor target by making the one-dimensional hierarchy of search by round robin processing. As a result, in the second embodiment, the size of the register area 500 of the state storage unit 50 can be reduced.

The memory system MS according to the second embodiment can obtain substantially the same effect as the first embodiment. The memory system MS according to the second embodiment can shorten the time for data transfer. The memory system MS according to the second embodiment can improve the performance of the memory system.

(d) Others

The embodiments are merely examples, and do not limit the scope of the present invention.

What is claimed is:

1. A memory system comprising:
a storage unit;
a nonvolatile memory; and
a memory controller capable of data reading from the nonvolatile memory, wherein
the nonvolatile memory includes a first memory die and a second memory die,
the first memory die includes a first plane and a second plane,
the second memory die includes a third plane, and
the memory controller is configured to:
issue a read command to the first memory die and the second memory die;
receive first data from the first memory die in a case where the first data is capable of being transferred from the first plane, second data is capable of being transferred from the second plane after the first data is capable of being transferred from the first plane, and third data is capable of being transferred from the third plane after the second data is capable of being transferred from the second plane;
receive the third data from the second memory die after completion of receiving the first data; and
receive the second data from the first memory die after completion of receiving the third data,
identification numbers are assigned to the first plane, the second plane, and the third plane, respectively,
the memory controller is further configured to:

decide a plane, to which one of the identification numbers is assigned, as a target of determination as to data transfer propriety, and determine whether or not the plane decided as the target of determination as to data transfer propriety is capable of data transfer;

if the plane decided as the target of determination as to data transfer propriety is not capable of data transfer, decide another plane, to which another one of the identification numbers is assigned, as a target of determination as to data transfer propriety, and determine whether or not the another plane decided newly as the target of determination as to data transfer propriety is capable of data transfer; and if the another plane decided as the target of determination as to data transfer propriety is capable of data transfer, read data from the another plane decided as the target of determination as to data transfer propriety, and the storage unit includes:
a first register configured to store the identification number assigned to the plane decided as the target of determination as to data transfer propriety, and
a second register configured to store first information indicative of the data transfer propriety of each of the first plane, the second plane, and the third plane.

2. The memory system according to claim 1, wherein the memory controller is configured to:
decide the first memory die as a target of determination as to data transfer propriety;
determine whether or not the first memory die is capable of data transfer;
if the first memory die is capable of data transfer, decide the first plane as a target of determination as to data transfer propriety;
determine whether or not the first plane is capable of data transfer;
if the first plane is capable of data transfer, receive the first data from the first plane and decide the second memory die as a target of determination as to data transfer propriety;
if the first plane is not capable of data transfer, decide the second plane as a target of determination as to data transfer propriety;
determine whether or not the second plane is capable of data transfer;
if the second plane is capable of data transfer, receive the second data from the second plane and decide the second memory die as a target of determination as to data transfer propriety;
determine whether or not the second memory die is capable of data transfer;
if the second memory die is capable of data transfer, decide the third plane as a target of determination as to data transfer propriety; and
if the third plane is capable of data transfer, receive the third data from the third plane.

3. The memory system according to claim 2, wherein the storage unit further includes:
a plurality of third registers each configured to store second information indicative of the data transfer propriety of each of the first memory die and the second memory die, and
a plurality of fourth registers each configured to store third information indicative of the data transfer propriety of each of the first plane, the second plane, and the third plane.

4. The memory system according to claim 3, wherein values of the plurality of third registers are each decided based on a result of a logical sum operation on values of the plurality of fourth registers.

5. The memory system according to claim 1, further comprising a first detection unit, wherein the first detection unit is configured to detect whether data is capable of being transferred from each of the first plane, the second plane, and the third plane.

6. The memory system according to claim 1, further comprising a scheduler, wherein the scheduler is configured to control a timing of data transfer from each of the first plane, the second plane, and the third plane.

7. The memory system according to claim 1, further comprising a first memory package and a second memory package, wherein
the first memory package includes the first memory die, and
the second memory package includes the second memory die.

8. A memory system comprising:
a storage unit;
a plurality of nonvolatile memories each including a plurality of planes; and
a memory controller capable of data reading from the plurality of nonvolatile memories, wherein
the plurality of nonvolatile memories include a plurality of memory dies, and
the memory controller is capable of storing one or another one of a plurality of first identification numbers permitting identification of the plurality of memory dies and one or another one of a plurality of second identification numbers permitting identification of the plurality of planes, and is configured to:
decide a memory die of the plurality of memory dies, to which the one of the first identification numbers is assigned, as a target of determination as to data transfer propriety;
determine whether or not the memory die decided is capable of data transfer;
if the memory die decided is capable of data transfer, decide a plane of the plurality of planes, which is included in the memory die decided and to which the one of the second identification numbers is assigned, as a target of determination as to data transfer propriety;
determine whether or not the plane decided is capable of data transfer;
if the plane decided is capable of data transfer, receive data from the plane decided, and newly decide another memory die of the plurality of memory dies, to which the another one of the first identification numbers is assigned, as a target of determination as to data transfer propriety;
determine whether or not the another memory die decided is capable of data transfer;
if the another memory die decided is capable of data transfer, newly decide another plane of the plurality of planes, which is included in the another memory die decided and to which the another one of the second identification numbers is assigned, as a target of determination as to data transfer propriety;
determine whether or not the another plane decided is capable of data transfer; and
if the another plane decided is capable of data transfer, receive data from the another plane decided, and
the storage unit includes:

a first register configured to store the plurality of second identification numbers; and a second register configured to store first information indicative of the data transfer propriety of each of the plurality of planes.

9. The memory system according to claim 8, further comprising a first detection unit, wherein the first detection unit is configured to detect whether data is capable of being transferred from each of the plurality of planes.

10. The memory system according to claim 8, further comprising a scheduler, wherein the scheduler is configured to control a timing of data transfer from each of the plurality of planes.

\* \* \* \* \*